United States Patent [19]

Bloomfield et al.

[11] Patent Number: 4,472,862

[45] Date of Patent: Sep. 25, 1984

[54] FILM FASTENERS FOR FLEXIBLE SHEETS

[76] Inventors: Roger D. Bloomfield, 12150 Greentree La., Colorado Springs, Colo. 80908; Stephen R. Kenin, P.O. Box 1848, Taos, N. Mex. 87571

[21] Appl. No.: 521,755

[22] Filed: Aug. 9, 1983

Related U.S. Application Data

[63] Continuation of Ser. No. 188,303, Sep. 18, 1980.

[51] Int. Cl.³ .......................................... A47H 13/00
[52] U.S. Cl. ..................................... 24/460; 24/462; 24/464; 160/392; 160/395
[58] Field of Search .......... 24/255 SL, 243 K, 248 B, 24/251, 258, 260; 160/392, 393, 394, 395, 396, 397

[56] References Cited

U.S. PATENT DOCUMENTS

| | | | |
|---|---|---|---|
| 1,201,338 | 10/1916 | Orr | 160/394 |
| 1,858,227 | 5/1932 | Johnson | 160/395 |
| 2,526,912 | 10/1950 | Swanson | 160/392 |
| 2,709,489 | 5/1955 | Keebler | 160/395 |
| 2,784,781 | 3/1957 | Rhoades | 160/397 |
| 3,220,469 | 11/1965 | Oehmig | 160/395 |
| 3,713,622 | 1/1973 | Dinger | 24/255 SL |
| 3,766,925 | 10/1973 | Rubricius | 24/255 SL |
| 3,805,873 | 4/1974 | Bloomfield | 160/392 |
| 3,833,046 | 9/1974 | Tombu | 160/395 |
| 3,906,592 | 9/1975 | Sakasegawa et al. | 24/255 SL |
| 3,987,835 | 10/1976 | Bloomfield | 160/392 |
| 3,993,212 | 7/1975 | Curry | 24/243 K |
| 3,999,258 | 12/1976 | Curry | 24/243 K |
| 4,194,312 | 3/1980 | Connors et al. | 160/395 |
| 4,267,876 | 5/1981 | Bloomfield | 160/395 |
| 4,279,064 | 7/1981 | Simme | 160/395 |
| 4,316,308 | 2/1982 | Chatelain | 160/395 |

OTHER PUBLICATIONS

Brochure of Nexus Corporation "S. C. Lock System", One Sheet, No Date.

Primary Examiner—Victor N. Sakran
Attorney, Agent, or Firm—Kinney & Lange

[57] ABSTRACT

A film fastening system including a rigid base extrusion, and a locking member which fits into the extrusion to securely hold a sheet such as polyethylene or the like along edges or at its midportions relative to a support. The fastener includes a hinged locking cover which places a clamping force on the sheet being held. The cover also covers the free edge of the sheet material when installed.

3 Claims, 2 Drawing Figures

FILM FASTENERS FOR FLEXIBLE SHEETS

This is a continuation of application Ser. No. 188,303, filed Sept. 18, 1980.

BACKGROUND OF THE INVENTION

1. Field of the Invention

The present invention relates to fasteners for flexible sheets or films.

2. Prior Art

U.S. Pat. Nos. 3,987,835 and 3,805,873 illustrate typical edge fasteners for flexible sheets utilizing a rigid channel, and an insert bar that fits over or is secured to the flexible sheet and then is held in the channel.

These devices work satisfactorily in many applications, but in some places it is desired to have a very secure lock on the film even though the use of a lock entails additional costs and takes some additional space.

Insert members for the channels such as those shown in the above identified patents have been modified to provide a resilient force tending to lock the insert member against portions of the channel. Such a device is shown in U.S. patent application Ser. No. 100,549, filed Dec. 5, 1979. The devices of this type are sold by Park Fastener Company, Colorado Springs, Colo. In those devices the insert which goes into the retainer channel for holding the polyethylene or other sheet film in place includes means to resiliently urge one edge of the insert against a detent surface of the channel to pinch the sheet between the insert and the surface of the channel to provide a secure holding force.

Additionally, a structure such as that shown in U.S. Pat. No. 3,893,212 and 3,999,258 has been used for holding a sheet of material. These devices include a flexible support channel as well as a lock insert. The channel and insert cooperate to pinch a sheet of material to hold it along its longitudinal length.

In some instances support channels have utilized edge retainer clips that clip over the upper edge of one wall of the channel and hold a layer of film placed over the edge of that channel. Such a device is shown in the advertisements of The Nexus Corporation, for their "S.C. Lok System". Further, it has been known to insert a flexible tube between upright walls of a channel insert similar to that shown in FIG. 14 of U.S. Pat. No. 3,987,835 so that the opposite walls of the insert are forced against the legs of the channel to pinch the sheet being held and securely lock it in position.

SUMMARY OF THE INVENTION

The present invention relates to a film fastening device utilizing a base channel over which the film is placed, and a lock bar member in a first portion of the channel, which serves to lock the film in the channel. The lock bar member includes a cover that extends out of the channel and is latched over a second portion of the channel to provide a resilient force urging the insert member against a wall of the first portion of the channel. As shown the cover member also overlies the second portion of the base channel which is used for holding the outer edge of the film or sheet being held to provide for a neat, finished appearance. The cover also can be used for covering the area in which screws for mounting the channel are placed.

Both the base channel and the lock bar member, including the cover portion can be extruded in a continuous operation. The base channel generally is made of a rigid material such as aluminum, while the insert that fits within the base channel is generally a semirigid elastomeric material.

The combined locking strip and cover used in combination with a properly designed base channel provides very secure holding of the film or sheet material.

DESCRIPTION OF THE PREFERRED EMBODIMENTS

Figure 1:
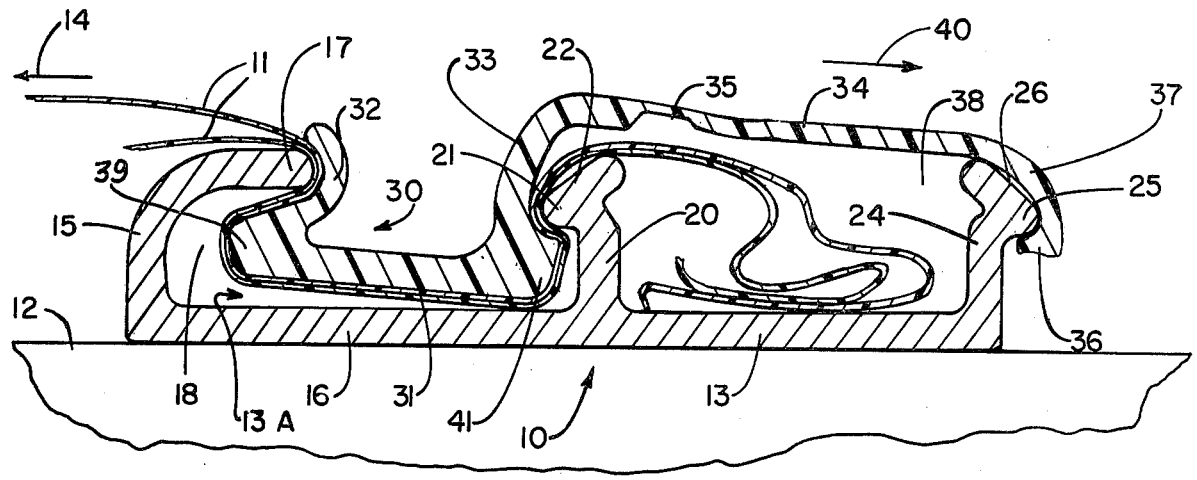
FIG. 1 is an end sectional view of a film fastening device made according to the present invention.
Figure 2:
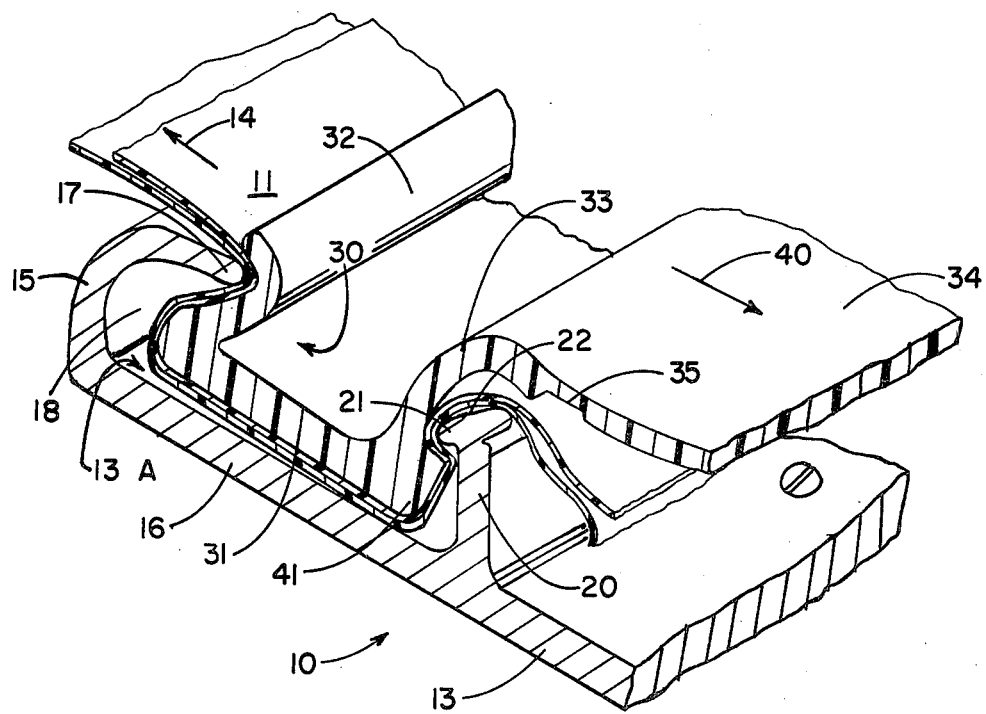
FIG. 2 is a fragmentary perspective view of a portion of the film fastening device with parts in section and parts broken away.

A film fastening system indicated generally at 10 is used for fastening sheet film indicated at 11 with respect to a support 12. The film fastening system 10 is generally mounted on the support to hold the edges of the film. This type of film locking system is widely used at the present time for fastening polyethylene film onto frames of greenhouses on solar collectors and other structures. The film shown here is doubled, so that there are two sheets of film that are held along one edge.

The locking device includes a base channel member 13 which is a rigid extrusion of substantial length, and which can be made of aluminum or similar material. The channel 13 could be made of a rigid or semirigid elastomer. The base channel 13 does provide the strength for holding against tension in the film or sheet being held. Generally speaking, the tension in a sheet is in the direction as indicated by the arrow 14.

The channel 13 has a first lock portion 13A which is formed by a first wall 15 adjacent one edge thereof, and this is the edge adjacent the direction of extension of the polyethylene or other sheet 11 being supported. The wall 15 is curved over the base wall 16 of the channel, and the upper rounded end portion 17 overlies the base wall 16 of the channel 13. The end portion 17 forms a relatively deep recess indicated at 18 adjacent the tension edge of the channel.

The base channel 13 is secured to the supporting surface 12 in a suitable manner such as with screws, adhesives, or other fasteners.

The channel portion 13A is further defined by a second upright wall 20 formed integrally with the base 16. Wall 20 is spaced from and extends in direction parallel to the wall 15. The second wall 20 has a longitudinally extending rib 21 spaced above the wall 16 and facing wall 15. The rib 21 forms a detent member cooperating with an insert or lock member 30 that is placed in the first portion of the channel. An upwardly facing inclined surface 22 is above the rib at the upper edge of the wall 20.

A third wall 24 is integral with the base 16 of the channel 13, and is spaced from and generally parallel to the intermediate wall 20. The wall 24 extends along the opposite edge of the base wall 16 from wall 15 and forms a second channel portion. The wall 24 has a longitudinally extending rib 25 adjacent the upper, outer edge thereof. Rib 25 is at the lower edge of an outwardly facing inclined surface 26 that extends from the top of the wall 24 downwardly and outwardly to the rib 25. This surface 26 forms a cam surface that faces in direction opposite from the surface 22. The base wall of the second channel portion forms a wide area for mounting screws for securing the channel to its support. Thus large screws that are hidden in use can be used.

The lock bar member 30 is an extrusion of a semirigid elastomeric material. The insert must have enough rigidity to provide its retaining function for holding the sheeting or sheet material in place.

The lock bar 30 has a first base portion 31, and an integrally molded wall 32 along one edge that fits against the rounded surface of end portion 17. The lock bar 30 has a second upright wall 33 that engages the detent rib 21. The film is held between these two walls 32 and 33 and the corresponding walls of the base channel. It should be noted that under normal locking action as disclosed in the prior patents discussed, when tension in direction of arrow 14 is applied to the sheet, the tension forces will tend to move the lock bar 30 toward the rib 21 and will create a pinching action to hold the sheet in place.

The lock bar has an integrally formed, hinged cover section 34 which is hingedly attached to the upright wall 33 through a hinge portion 35. The cover section has an edge portion 37 that curves downwardly to the outside of the wall 24 and an inwardly directed latch lip 36 is formed at the outer edge of the cover. The latch rib fits underneath the rib 25 when the cover is snapped in place. The cover thus will cover the receptacle 38 that is formed between walls 20 and 24 of the base channel and cover the mounting screws and the edges of the film stored in the receptacle 38.

The cover section is made of material that will exert a force tending to urge the wall 33 against the rib 21 under normal conditions when there is a sheet or film 11 positioned in the channel between the walls 15 and 20. The resilient force from the cover tends to pinch the film or sheet to hold it against the detent rib 21. As can be seen if the form of the rib 21 and the mating wall portion 33 of the lock member are correct, the bottom of the base 31 of the lock bar 30 will be urged against the upper surface of the base 16 on the channel to further create a pinching or holding action.

An additional benefit is obtained with the cover member. In addition to urging the wall 33 of the lock bar against detent rib 21, the cover covers the receptacle 38. The loose edges of the film that is being held can be placed in the receptacle 38, and when the cover is snapped in place these loose edges will be out of sight.

The wall 24 does not have to be a continuous wall, nor does it have to necessarily be integral with the channel base 16 that carry walls 15 and 20. For example, a separated wall or individual lugs could be placed on the supporting surface 12 at locations spaced from the wall 20 at desired locations along the length of the channel portion 13, and then the cover member can be latched over the lugs to create the resilient force generally in the direction as indicated by the arrow 40 to urge the wall 33 to pinch the sheet of film or material being held against the detent rib 21.

The cover member does extend out of the channel formed by walls 15 and 20, which is the retaining channel. As shown the cover is one piece.

The tension in the film 11, as indicated by the arrow 14, will tend to lift up the lock bar and in particular the base portion 31 of the lock bar adjacent the wall 15. It can be seen that when this is done, the wall 33 will be urged against the detent 21.

The insertion of the lock bar 30 is accomplished by permitting the edge rib indicated generally at 39 at the junction of the wall 32 and base 31 to be forced into the concave recess 18 underneath the end portion 17 of wall 15, so that the opposite edge lug 41 of the lock bar, where wall 33 joins base 31, will pass the detent rib 21 to seat the lock bar in position. The cover is snapped into place and the film is then held in place by the detent rib 21 and the holding action of the wall 33 of the lock bar.

Once the cover is lifted the lock bar can be pushed into the recess 18 and the lug portion 41 of the wall 33 can be slipped past the detent rib 21 so that the entire lock bar 30 can be removed from the base channel.

What is claimed is:

1. A locking device for frictionally engaging a portion of a sheet of material and securing such sheet of material against movement under tension in such sheet, the device comprising a fixed channel member having a base and first, second and third generally upwardly extending, spaced apart, co-extensive walls, the first wall having a first upper portion spaced from the base and extending toward the second wall to form a deep recess along the base of the fixed channel member at one edge thereof, the second wall having a second upper portion forming a first rib based from the base and extending toward the first wall to provide a second recess along the base of the fixed channel member spaced from the first recess to define a channel shaped space between the first and second walls, and the third wall being along the edge of the channel opposite from the first wall and having an upper portion forming a second rib positioned above the base and extending in an outward direction away from the second wall; a removable member associated with the channel member including a lock bar and a connected cover member, the cover member being made of an elastomeric material, the lock bar being positionable between the first and second walls and the cover member connected to the lock bar being extendible over the second and third walls in a generally planar orientation between the second and third walls, and thereby overlying the receptacle formed between the second and third walls; said cover member having a lip portion at its outer edge extending along the cover member for engaging the second rib of the third wall; the lock bar being positioned between the first and second walls in use and having a first lock bar edge portion fitting into the first recess and having a first resilient lock bar wall portion extending upwardly from the first lock bar edge portion to fit against the upper portion of the first wall of the fixed channel member which faces the second wall thereof; said lock bar having a shoulder along a second edge portion thereof which fits under the first rib, and a second lock bar wall portion at the lock bar second edge which extends upwardly to position above the second wall of the fixed channel member, said cover member being attached to the second lock bar wall portion substantially along the length of the lock bar; the cover member being of size to be placed in tension in direction between the second and third walls of the fixed channel member to urge the shoulder on the second edge portion of the lock bar toward the first rib, a sheet to be fastened being positioned over the first wall of the fixed channel member, under the lock bar, over the second wall of the fixed channel member, and under the cover in the space between the second and third walls of the fixed channel member so that portions of such sheet extending between the second and third walls of the fixed channel member are hidden by the cover member, and such sheet being subjected to tension in a direction relative to the first wall of the channel member opposite from the position of the second wall, said lock bar thereby being urged under tension in such sheet and by the tension in the cover member to cause the shoulder of the lock bar to pinch such sheet against the first rib and the first resilient wall portion of the lock bar being lifted to pinch such sheet against the upper portion of the first wall of the fixed channel member, the main portion of a sheet which is held by the locking device extending in a direction away from the locking device without overlying the locking device.

2. The combination as specified in claim 1 wherein said cover member and said lock bar comprise an integrally molded elastomeric extrusion and said cover member is joined to said lock bar by a flexible portion of elastomeric material extending longitudinally along said lock bar.

3. The combination as specified in claim 2 wherein said flexible portion comprises a section reduced in thickness and extending along the hinge line.

* * * * *